Oct. 20, 1936.　　G. J. DEHN　　2,057,883
GREASE TRAP
Filed March 19, 1932　　2 Sheets-Sheet 2

Inventor:
George J. Dehn
By Fred Gerlach
his Atty.

Patented Oct. 20, 1936

2,057,883

UNITED STATES PATENT OFFICE 2,057,883

GREASE TRAP

George J. Dehn, Chicago, Ill.

Application March 19, 1932, Serial No. 599,917

5 Claims. (Cl. 210—56)

The invention relates to grease traps.

One object of the invention is to provide a grease trap of the catch-basin type containing means for separating grease from drainage, with means for separating the solid matter from the drainage before the drainage passes into the grease retaining chamber.

Another object of the invention is to provide an improved cooling unit for the grease in the basin, which consists of a coil of pipe which can be easily assembled in the basin and is efficient in cooling.

Other objects will be apparent from a consideration of the following detailed description.

The invention consists in the several novel features which are hereinafter set forth and are more particularly pointed out by the claims at the conclusion hereof.

Figure 1:
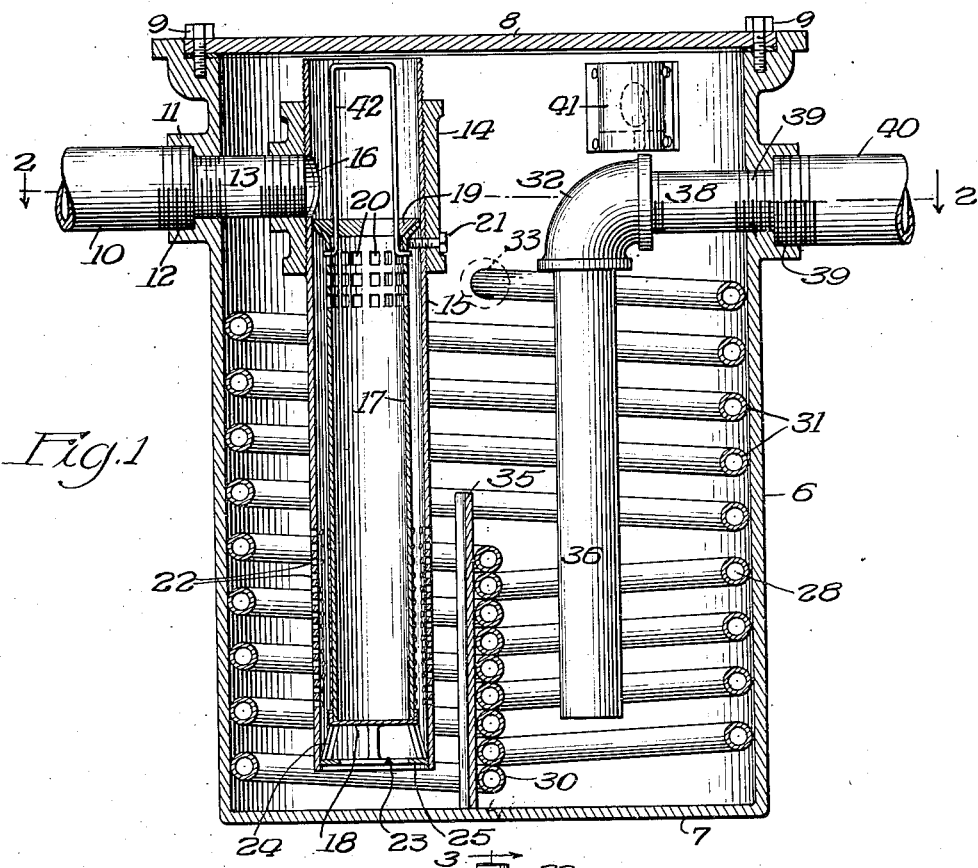
Figure 2:
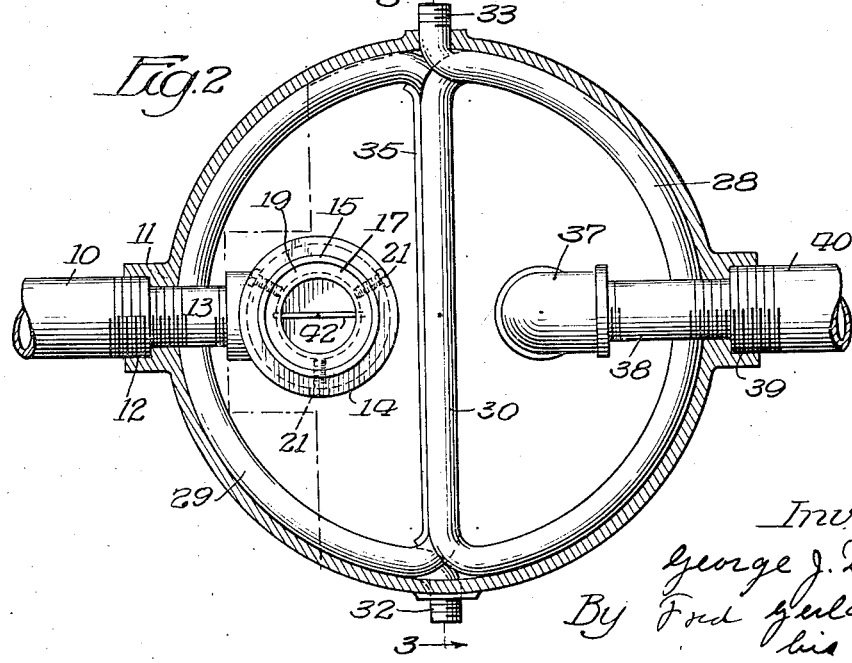
Figure 3:
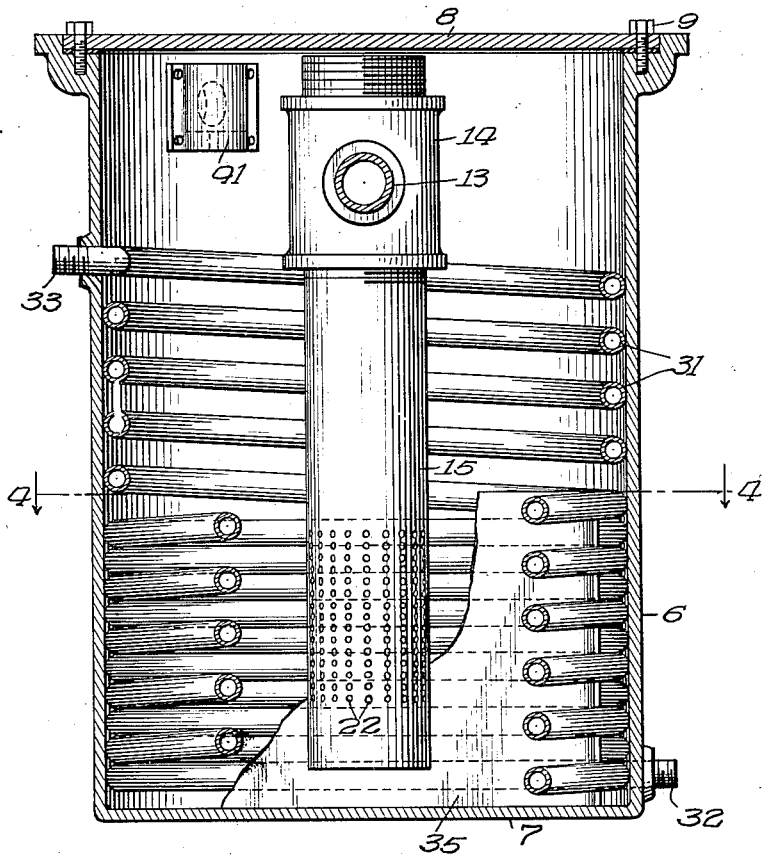
Figure 4:
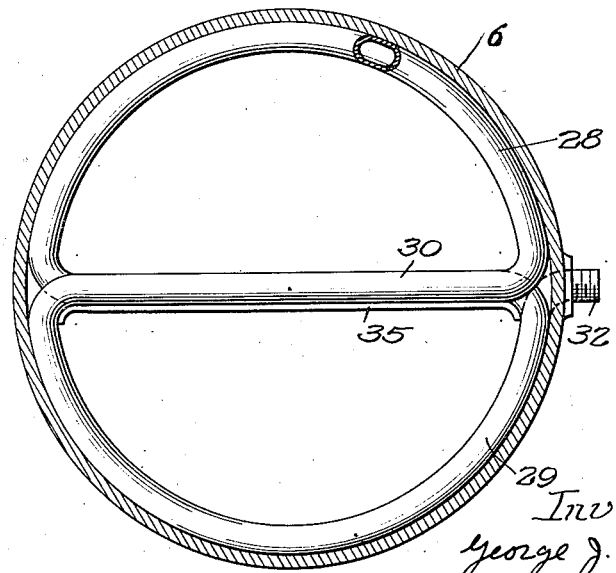

In the drawings: Fig. 1 is a vertical section of a grease trap embodying the invention. Fig. 2 is a horizontal section on the line 2—2 of Fig. 1. Fig. 3 is a vertical section on the line 3—3 of Fig. 2. Fig. 4 is a horizontal section on the line 4—4 of Fig. 3.

The invention is exemplified in a grease trap comprising a basin having a cylindrical sidewall 6 and an integral bottom 7. The basin is open at the top to provide access to the inside and a top-cover 8 is removably secured to the top margin of the side wall 6 by screws 9. An inlet pipe 10 is threaded into an opening 12 in a nipple 11 on the side-wall 6 adjacent the top of the basin to deliver the drainage to the basin. A short horizontal pipe-section 13 is threaded into the inner end of opening 12. A T-fitting 14 has its central branch threaded to the inner end of pipe-section 13. A vertical pipe 15 is threaded to and extends vertically through the end branches of fitting 14. An opening 16 is provided in pipe 15 through which drainage from pipe 13 will flow into pipe 15. The upper end of pipe 15 is open but terminates substantially at the cover 8 and above the highest liquid level, so that drainage cannot escape through the top of the pipe 15 into the basin. A retainer with a tubular wall 17 and a closed bottom 18 is disposed in the pipe 15 to strain the solids from the drainage. This retainer has an upwardly flared mouth 19 at its upper end which fits in the pipe 15 and directs the drainage entering the pipe 15 into the retainer. The portion of the retainer immediately below its mouth is provided with holes 20 to permit the liquid and grease in the drainage to flow into the portion of the pipe 15 below the mouth 19.

The tube 17 of the retainer is smaller in diameter than the pipe 15 to provide an annular downward passage for the drainage. Set screws 21 removably support the retainer 17 in the pipe 15. The lower end of pipe 15 is open to permit the strained drainage to pass into the lower portion of the basin at one side of the baffle hereinafter described. Adjacent its lower end, pipe 15 is perforated as at 22 to discharge some of the drainage laterally into the basin. This breaks up or distributes the flow and prevents sufficient flushing to carry the grease from the basin, and retards the flow, so the grease in the drainage can be cooled and separated. Pipe 13 is smaller in diameter than the inlet pipe 10 to retard the delivery of the drainage to the basin, for the same purpose. A spider or frame 23 is attached to the lower end of wall 17, and comprises downwardly and outwardly inclined legs 24, a connecting ring 25 at the lower ends of the legs, and a ring 26 at their upper ends. The grease in the drainage flowing downwardly between retainer 17 and pipe 15 impacts against this spider and is disintegrated so it can be more readily cooled.

The improved cooling device consists of a coil of pipe in the basin and through which water is circulated. The coil is formed of a continuous length of pipe bent to conduct cooling water around the outside of and diametrically across the lower portion of the chamber in the basin, and around the outside of the upper portion of said chamber. For this purpose, the cooling pipe comprises a series of alternately and oppositely arranged semi-circular loops 28 and 29 serially connected by diametrically extending members 30 which constitute a baffle in the lower portion of the basin where the drainage is discharged from downtake pipe 15, and a series of helical coils 31 in the upper portion of the basin. The lower end of this pipe-coil is extended through the side wall of the basin, as at 32, for connection to a supply pipe for cold water, and its upper end 33 extends through the side wall of the basin, for connection to a drain pipe, so that cooling water may be constantly circulated through the coil to congeal the grease in the drainage. The loops 28 and 29 of the coil contact with the drainage around the side of the basin and the diametric members 30 coil contact the drainage in the central portion. The downtake pipe 15 is located adjacent one side of the diametric members 30, so that it will pass over, or be baffled by, said members of the coil in transit to the discharge side of the basin. These members act as a baffle, but, if desired, a plate 35 may be placed across one side of them to prevent drainage from leaking between them into the discharge side of the basin.

A discharge connection for the drainage from which the grease has been separated comprises a vertical pipe-section 36 having its upper end connected to an elbow 37 and a short horizontal pipe-section or nipple 38 which is connected to said elbow and threaded into a hole 39 in the side of the basin opposite to the inlet opening 12. A pipe 40 is also threaded into hole 39 to carry the drainage, from which the grease has been separated, to the sewer. A guarded vent 41 is provided in the upper portion of the basin to prevent pressure in the basin.

In operation, the drainage from kitchens or other places flows into the upper end of down-take pipe 15 and thence into the retainer 17. The coarse solids in the drainage settle in the retainer and are thus separated therefrom to prevent them from passing into the cooling chamber in the basin. This retainer is provided with a bail 42 and is removable through the top of pipe 15 when the cover 8 has been removed, so the accumulated solids can be easily removed as often as necessary. The drainage passes from the retainer through holes 20, thence downwardly in pipe 15 and around tube 17, and is discharged through the lower end of pipe 15 and also laterally through holes 22. Any large pieces of grease are broken up by the spider at the lower end of pipe 15. Pipe 15 delivers the drainage into the basin at one side of baffle 35 and coil-member 30, so that it must pass over them before reaching the outlet pipe 36. This causes the drainage to contact with the cooling coil to congeal efficiently the grease so it will rise and collect in the upper portion of the basin. The helical coils 31 in the upper portion of the basin will further cool the drainage. The drainage, after it has passed over the baffle, and the grease has been separated therefrom, will pass into the lower end of pipe 36 and be discharged through pipe 40. A column of water remains in the basin up to the level of the pipe 40 and the grease floats on the water.

The invention exemplifies a grease trap, which is provided with a device for separating the solids from the drainage before it is cooled; in which the flow of the drainage is retarded for efficient separation of the grease; in which the cooling unit consists of a coil of pipe which is separate from the basin and bent to form a baffle, and extends to the upper portion of the basin for efficient cooling and separation; and in which the retainer for the solids can be easily unloaded of the accumulation therein. When the cooling unit is formed of a coil of pipe, a heavy casting is dispensed with and the unit can be easily removed for repair.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a grease trap of the character described, the combination of a basin, comprising a continuous side wall and a bottom, an inlet pipe for drainage connected to the upper portion of the basin, a vertically extending down-take pipe disposed in the basin in spaced relation with respect to the side wall, connected at the upper end thereof to receive drainage from said inlet pipe and having holes in its lower end for discharging the drainage laterally into the lower portion of the basin, a tubular retainer with a closed bottom for solids, arranged in the down-take pipe to receive the drainage upon entry thereof into the down-take pipe from the inlet pipe, said retainer being spaced from the inner face of the down-take pipe so as to form an annular passageway therebetween and being provided with openings adjacent its upper end to discharge the drainage into such passageway for down flow to the openings in the lower end of the down-take pipe, and an outlet connection comprising a pipe to receive the drainage adjacent the bottom of the basin.

2. In a grease trap of the character described, the combination of a basin, an inlet pipe for drainage connected to the basin, a down-take pipe connected to receive drainage from said inlet pipe and to discharge into the lower portion of the basin at one side thereof, a tubular retainer with a closed bottom for solids, disposed in the down-take pipe and provided with openings adjacent its upper end to discharge into the down-take pipe, the down-take pipe being open at its lower end and provided with openings in its side, and an outlet connection comprising a pipe to receive the drainage adjacent the bottom of the basin.

3. In a grease trap of the character described, the combination of a basin, an inlet pipe for drainage connected to the upper part of the basin, a down-take pipe connected to receive the drainage from said inlet pipe and to discharge into the lower portion of the basin at one side thereof, a tubular retainer with a closed bottom for solids, disposed in the down-take pipe and provided with openings adjacent its upper end to discharge into the down-take pipe, the down-take pipe being open at its lower end, means adjacent the lower end of the down-take pipe for breaking up the matter in the drainage, and an outlet connection comprising a pipe to receive the drainage adjacent the bottom of the basin.

4. In a grease trap, the combination of a basin comprising a continuous side wall and a bottom, a vertically extending pipe positioned in the basin in spaced relation with respect to the side wall and having its upper end connected to receive drainage and its lower end open to discharge the drainage near the bottom of the basin, a vertically extending discharge pipe for the drainage positioned opposite the inlet pipe in spaced relation with respect to the side wall and having the lower end thereof open to receive the drainage and its upper end connected to discharge the drainage from the basin, a cooling unit for congealing the grease in the drainage as the latter flows through the basin, consisting of a coil of pipe disposed in the basin in direct contact with the drainage and comprising substantially horizontally extending loops encircling the inner face of the side wall of the basin and extending around the inlet and discharge pipes and cross members connected serially with the loops and forming a baffle across the bottom of the basin and between the lower ends of the inlet and discharge pipes, and means for circulating a cooling fluid through the coil of pipe.

5. In a grease trap, the combination of a basin comprising a continuous side wall and a bottom, a vertically extending pipe positioned in the basin in spaced relation with respect to the side wall and having its upper end connected to receive drainage and its lower end open to discharge the drainage near the bottom of the basin, a vertically extending discharge pipe for the drainage positioned opposite the inlet pipe in spaced relation with respect to the side wall and having the lower end thereof open to receive the drainage and its upper end connected to discharge the drainage from the basin, a cooling unit for congealing the grease in the drainage as the latter flows through the basin, consisting of a coil of pipe disposed in the basin in direct contact with the drainage and comprising large loops around the central and upper portions of the inlet and discharge pipes and small loops around the lower ends of said pipes connected serially to the large loops and shaped to form cross members for forming a baffle between the lower ends of the inlet and discharge pipes, and means for circulating a cooling fluid through the coil of pipe.

GEORGE J. DEHN.